United States Patent [19]

Greenstreet et al.

[11] Patent Number: 4,918,017
[45] Date of Patent: Apr. 17, 1990

[54] SCREEN ASSEMBLY FOR SCREENING ELASTOMERIC MATERIAL

[75] Inventors: Arthur W. Greenstreet, Clinton; Gerardo P. Elia, Akron; Charles D. Spragg, Hudson, all of Ohio

[73] Assignee: Bridgestone/Firestone, Inc., Akron, Ohio

[21] Appl. No.: 305,688

[22] Filed: Feb. 3, 1989

[51] Int. Cl.$^4$ .............................................. B29B 13/10
[52] U.S. Cl. ................................. 425/197; 425/376.1; 425/382.4
[58] Field of Search ............ 425/197, 198, 199, 376.1, 425/382.4, 377, 378.1, 379.1; 210/171, 474, 477, 489, 499; 264/171

[56] References Cited

U.S. PATENT DOCUMENTS

| | | | |
|---|---|---|---|
| 1,246,048 | 11/1917 | Brown | 425/376.1 |
| 1,397,571 | 11/1921 | Bowen | 425/377 |
| 2,488,595 | 11/1949 | Henning | 425/376.1 |
| 2,539,129 | 1/1951 | Gray | 425/198 |
| 2,593,136 | 4/1952 | Gliss | 425/199 |
| 2,593,198 | 4/1952 | Rutherford | 425/199 |
| 3,327,853 | 6/1967 | Bixby | 210/499 |
| 3,492,692 | 2/1970 | Soda et al. | 264/171 |
| 3,583,033 | 6/1971 | Christofas et al. | 425/379.1 |
| 3,583,034 | 6/1971 | Colombo | 425/379.1 |
| 3,584,355 | 6/1971 | Fischer | 425/376.1 |
| 3,609,806 | 10/1971 | Schippers et al. | 425/376.1 |
| 3,613,170 | 10/1971 | Soda et al. | 264/171 |
| 3,716,144 | 2/1973 | Bartlow | 210/499 |
| 3,777,893 | 12/1973 | Ginaven | 210/499 |
| 3,811,659 | 5/1974 | Taylor et al. | 425/199 |
| 3,863,001 | 1/1975 | Thumudo | 425/197 |
| 3,963,403 | 6/1976 | Hughes et al. | 425/379.1 |
| 4,011,038 | 3/1977 | Willemsen | 425/376.1 |
| 4,541,982 | 9/1985 | Upmeier | 425/378.1 |

FOREIGN PATENT DOCUMENTS

| | | | |
|---|---|---|---|
| 519784 | 12/1953 | Belgium | 425/198 |
| 1089709 | 10/1957 | France | 425/199 |
| 55-77546 | 6/1980 | Japan | 425/197 |

*Primary Examiner*—Jay H. Woo
*Assistant Examiner*—James P. Mackey
*Attorney, Agent, or Firm*—Ronald B. Brietkrenz

[57] ABSTRACT

A screen assembly for mounting on the outlet end of an extruder for removing foreign particles from an elastomeric material being discharged from the extruder. The assembly includes a screen support member having a plurality of spaced elongated ribs formed integrally with or removably mounted on a surrounding member. The spaced ribs form a plurality of elongated slots therebetween which provide flow paths for the elastomeric material, and preferably are concavely-shaped in the direction of travel of the extruded material. A mesh screen formed of a high tensile strength, work hardened stainless steel wire cloth is formed complementary to the concavity of the ribs and is mounted in juxtaposition to the ribs for removing the foreign particles as the elastomeric material passes through the screen. The concavity of the ribs and formation of the elongated material flow paths, reduce the amount of back pressure created in the elastomeric material and reduces the bending and shear forces created on the ribs and surrounding support member.

17 Claims, 8 Drawing Sheets

SCREEN ASSEMBLY FOR SCREENING ELASTOMERIC MATERIAL

BACKGROUND OF THE INVENTION

1. Technical Field

The invention relates to extruded materials and in particular to extruded elastomeric materials, such as rubber compound for use in the formation of tread strips and side wall strips for use in the manufacture of pneumatic tires. More particularly, the invention relates to a screen assembly for removing foreign particles from rubber compounds being discharged from a usual extruder prior to forming the extruded rubber compound into the desired formation for use in a tire manufacturing operation.

2. Background Information

In the manufacturing of vehicle tires, one of the major ingredients is elastomeric material or "rubber" which is obtained from various sources and compounded with other ingredients. This rubber compound is ultimately placed in usual screw-type extruders, where it is heated and forced through the extruded discharge, afterwhich it is generally extruded into sheets or strips of the rubber compound, or in certain applications, directly into a cylindrical configuration for subsequent use in the tire manufacturing procedure. This rubber compound usually contains a variety of foreign particles and materials depending upon its place of origin which may range from pieces of burlap sack, wood chips, nuts and bolts, hard metal flakes, and the like. These foreign materials must be removed to ensure that the final extruded product is sufficiently free of such materials before being incorporated into the tire manufacturing process.

It is a common practice in various industries, but not in the tire manufacturing industry, to remove such foreign materials, by passing the material through screen assemblies which effectively strain and remove the foreign particles from the material passing therethrough. Many screw extruders designed for thermoplastics are supplied with breaker plate screen supports which are simply flat plates of high strength steel with a plurality of holes drilled through them. Screen packs which are mounted on such breaker plates, are often used in plastic extrusion to create back pressure in the extruder in order to stabilize pumping rates and enhance mixing in the extruder screw. Thus, this creation of back pressure in the plastic extrusion industry is beneficial during the extrusion step and therefore there has been very little use or need for low pressure screening systems.

Perforated dome-shaped screen supports are available for screening rigid PVC material enabling them to be made slightly thinner and to have less pressure drop than flat plates. Also automatic screen changers are popular in certain industries in which one or two breaker plates are mounted in a sliding shuttle, whereas in other installations, a belt of wire fabric is drawn across a stationary support plate to provide the screening element adjacent the extruder discharge.

The synthetic fibers industry has adopted "extended area" filtration systems, wherein filter screens and/or felts can be wrapped around a perforated pipe support, in which the filter medium can be pleated, or a powder can be sintered to form a porous tube. These structures are sometimes combined, but flow is usually inward. Because of the extreme filtration required and nearly Newtonian rheology of nylon or PET polymers, pressure drop through such supports is much less than through the filter medium. Also, screen changing and cleanup is much more complicated than for the plastics industry discussed previously.

Screen basket type assemblies also have been used, mainly in the chemical and food processing industry. Basket strainers comprised of a 20 mesh/inch filtering basket mounted inside a two to four mesh support basket, have been used in experimental demonstrations of low pressure straining of rubber compounds. However, it was found to be impractical to fabricate a sufficiently strong support basket of good quality and proper dimensions. Heavy gauge wire cloth which work-hardens in weaving resists subsequent rolling and welding operations to form the basket and annealing the wire cloth would destroy its strength. Custom adapters had to be machined to fit each support basket to the extrusion head. Also, recovery of used baskets proved to be an even greater problem because rubber could not be removed, nor could the filtering and support baskets be separated. These experimental basket filters were recovered by burning the rubber away from the basket, but this is environmentally unacceptable and costly for production.

Many types of elastomeric material or rubber compounds are extruded from large extruders at rates generally between 5,000 lbs/hr. and 15,000 lbs/hr. without screening. In those applications requiring screening, extremely thick breaker plates are needed to resist the pressure force which is exerted over the large diameters, which increases back pressure. Rubber compound extruder screws usually are designed more for high output than high pressure, so that extra pressure causes intense back mixing. Unless extruder output is drastically reduced typically by 40% to 50%, the back pressure will generate excess heat within the stream of elastomeric material which can scorch the rubber compound.

One common type of screen assembly intended to reduce back pressure in a rubber compound extruder consists of several relatively small thin breaker plates and a large thick support plate. For example, seven 2.5 inch diameter breaker plates are set into the counterbores of holes through a 10 inch diameter support plate, three inches thick. However, the use of such support plates with a plurality of circular holes formed therein, requires an extremely thick screen support plate in order to withstand the high internal shear and bending stresses exerted thereon. This thickness increases considerably the back pressure within the incoming stream of rubber compound, thereby increasing the scorching problem requiring reduced output to avoid such scorching.

Another problem with the screening of elastomeric material is that start-ups with cold stiff rubber, generate extreme high internal pressures, so the screen assembly must be safe from rupture possibly up to 2000 psi.

Therefore the need exists for a screen assembly for screening elastomeric materials which is able to withstand relatively high pressures which are exerted thereon by the moving stream of elastomeric material, at the time of start-up, without creating an excessive back pressure and without reducing the usual output rate of the extruder.

SUMMARY OF THE INVENTION

Objectives of the invention include providing an improved screen assembly for screening elastomeric materials such as rubber compounds used in the tire manufacturing industry, which will enable the output of usual extruders to be maintained at the desired rate without creating excessive back pressures in the rubber compound resulting in scorching, as occurs in the prior art.

Another objective is to provide such an improved screen assembly which is able to withstand the usual high internal extrusion pressures and furthermore is able to withstand the higher pressures created during start-up with cold stiff rubber compound, without breakage and without creating excess back pressures, and in which the assembly can be utilized with various size screen meshes, thereby enabling various screening procedures to be carried out easily, by merely changing the size of the screen mesh without appreciably modifying the screen support member thereof.

A still another objective is to provide such a screen assembly in which the screen support member preferably is concavely curved to be in tension stress, enabling the screen support member to be of a considerably thinner material than if flat members are used, since such flat members are under shear and bending stress since the pressure drop through a screen support is proportional to its thickness and is therefore reduced by the use of thinner screen support members.

Still another objective of the improved screen assembly is to provide for slotted flow passages in the screen support member, which offers less surface to the flowing rubber compound for wall shear stresses, further reducing pressure loss, and which reduces the pressure gradients considerably greater than the perforated plates having circular holes as in prior art screen support members.

Still another objective is to provide such an improved screen assembly in which the spacing between the screen support ribs can be adjusted, enabling the assembly to conform to various screening applications by merely changing the transverse width of the slots created between the support members in a simple manner, and which will enable screens of various mesh and wire diameter sizes to be utilized without modifying the entire screen support member.

A further objective is to provide such a screen assembly in which the mesh metal screen preferably is preformed which increases its ability to support itself by creating a more effective force angle for tension stress to resist applied pressure, and in which the screened edges are firmly retained in the screen mounting or support member, so that the screen can withstand tensional stress.

Still another objective of the invention is to provide such an improved screen assembly which is adaptable to be mounted on usual extruders without material modifications thereto, and which achieves the advantages in a variety of embodiments which are relatively simple in construction, yet highly efficient and durable in use.

These objectives and advantages are obtained by the improved screen assembly of the invention, the general nature of which may be stated as including, a mesh screen adapted to be mounted adjacent the discharge outlet of an extruder for removing foreign particles from an elastomeric material being discharged from the extruder; support means for supporting the mesh screen adjacent the discharge outlet of the extruder, said support means having a plurality of spaced elongated support ribs forming a plurality of elongated slots therebetween for passage of the elastomeric material, with said screen being in juxtaposition to the ribs on the upstream side of the discharged material; and means for mounting the support means and screen adjacent the discharge end of the extruder.

BRIEF DESCRIPTION OF THE DRAWINGS

Preferred embodiments of the invention, illustrative of the best modes in which applicants have contemplated applying the principles, are set forth in the following descriptions and are shown in the drawings and are particularly and distinctly pointed out and set forth in the appended claims.

Similar numerals refer to similar parts throughout the drawings.

DESCRIPTION OF THE PREFERRED EMBODIMENTS

A first embodiment of the improved screen assembly is indicated generally at 1, and is shown particularly in FIGS. 1-10. Screen assembly 1 is shown in FIGS. 1-6 mounted on an extrusion head outlet transition plate indicated generally at 2. Plate 2 is adapted to be mounted by a plurality of bolts which extend through bolt receiving holes 3 formed therein onto a matching plate which is mounted on the outlet or discharge end of a usual extruder. The particular type of extruder with which screen assembly 1 is adopted for use may vary and is of the type for extruding rubber compounds or other elastomeric material, preferably for use in the manufacture of components for pneumatic tires, such as treads, sidewalls, innerliners, inner tubes, and similar components. However, it can have applications in other fields and need not be limited to the tire industry.

Screen assembly 1 includes a pair of side supports indicated generally at 5 (FIGS. 4-6), which are clamped within a rectangular-shaped recess 6 formed in the rear face 7 of transition plate 2. Side supports 5 have a stepped configuration (FIG. 5) which are abutted and anchored against a longitudinally extending shoulder 8 formed in recess 6, outboard of material discharge channel 9 of transition plate 2.

Grooves 11 are formed along a concave top surface 12 of each side supports 5 for receiving a ferrule 13 therein (FIG. 5) for assistance in securing a mesh metal screen 15 (FIG. 7) in clamped position, as described in greater detail below. Screen 15 is made from high tensile strength, work-hardened stainless steel wire cloth and prevents the passage of contaminants contained in the rubber compounds.

Figure 5:
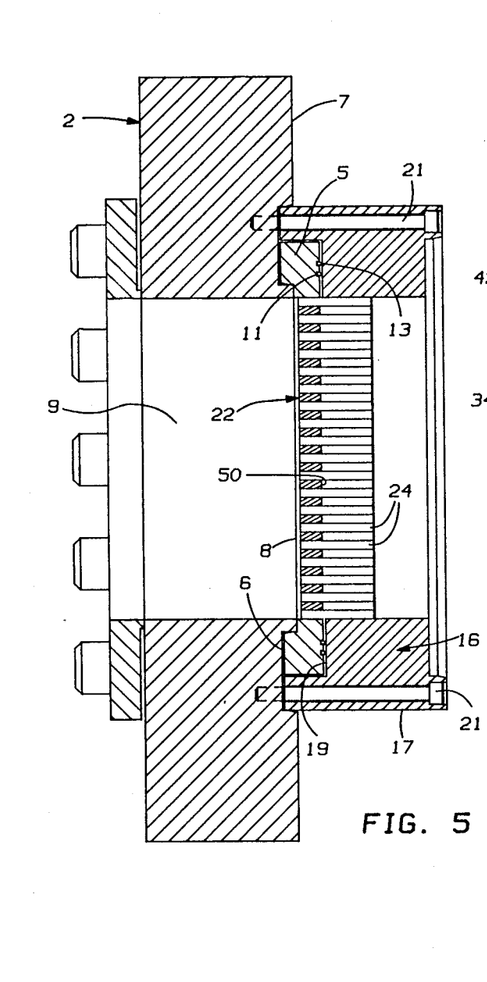
FIG. 5 is a sectional view similar to FIG. 3 but rotated 90°.
Figure 6:
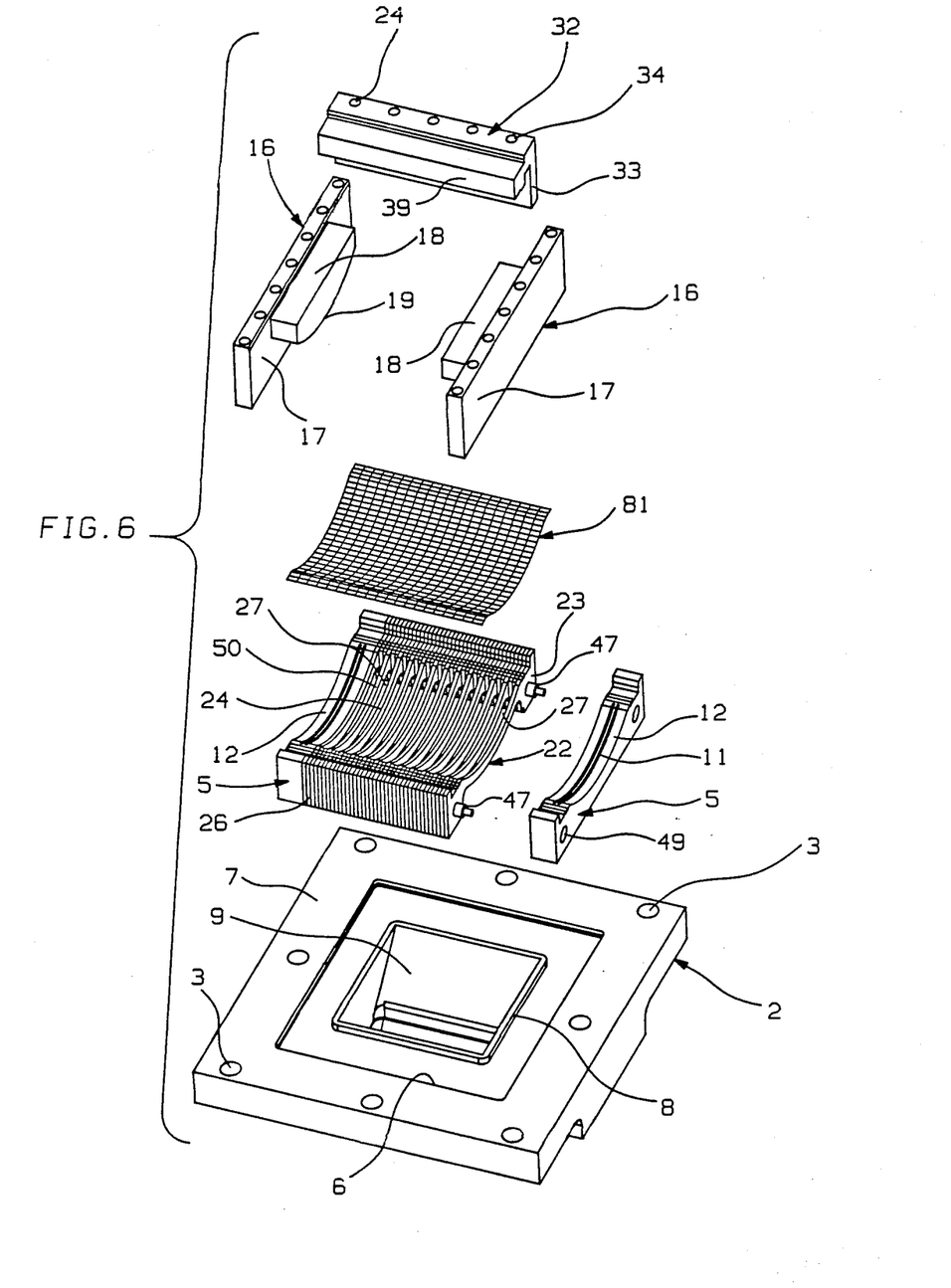
FIG. 6 is a fragmentary exploded perspective view of the improved screen assembly and extrusion die head transition plate which is shown in assembled position in FIG. 1.
Figure 7:
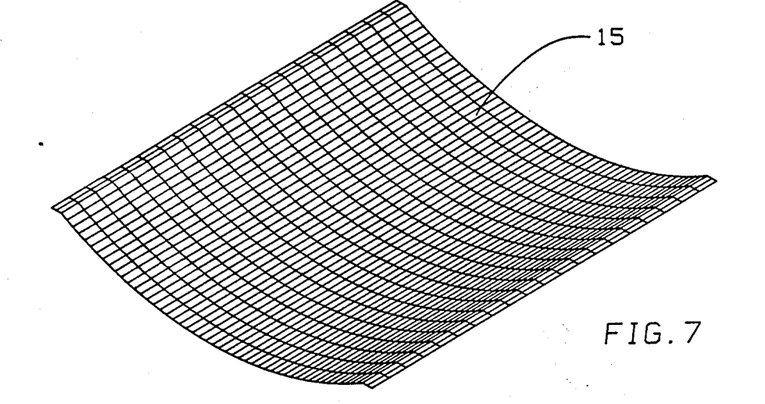
FIG. 7 is a perspective view showing the mesh screen prior to assembly.

Side supports 5 are clamped against transition plate shoulders 8 (FIG. 5) by a pair of side clamping plates indicated generally at 16 (FIG. 6). Clamping plates 16 are similar to each other, each including a main rectangular-shaped wall member 17 and a screen clamping member 18 having a convex bottom surface 19 which is generally complementary to the concavity of top surface 12 of side supports 5.

As shown particularly in FIG. 5, clamping plates 16 are seated within recess 6 of transition plate 2, and are bolted to plate 2 by a plurality of bolts 21. Convex surface 19 clamps tightly against concave top surface 12 to securely anchor and position side supports 5 within transition plate recess 6.

Figure 8:
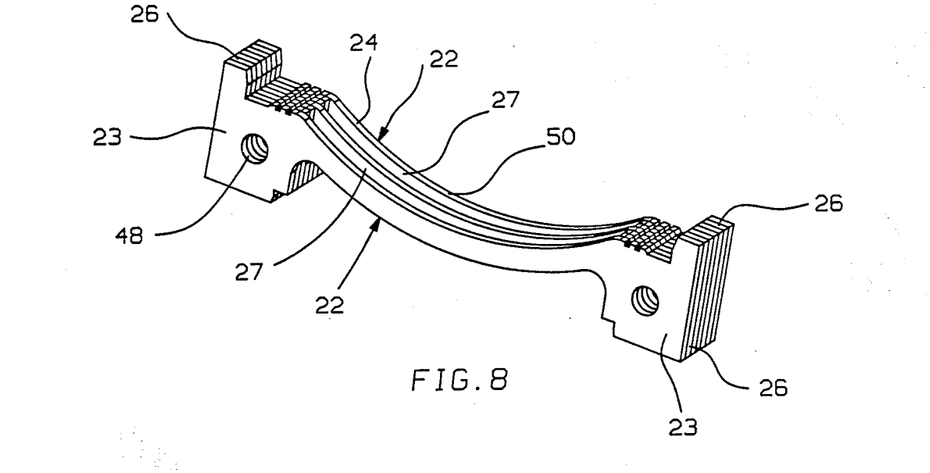
FIG. 8 is a perspective view of three of the screen support ribs and associated spacers removed from the improved screen assembly.
Figure 9:
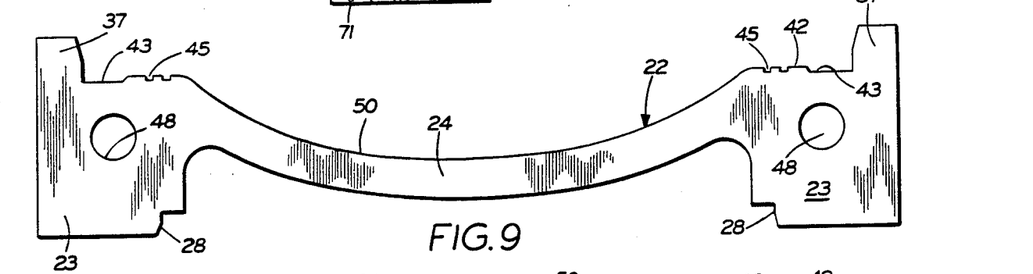
FIG. 9 is an enlarged side elevational view of one of the screen support ribs of FIG. 8.
Figures 10, 15, 16:
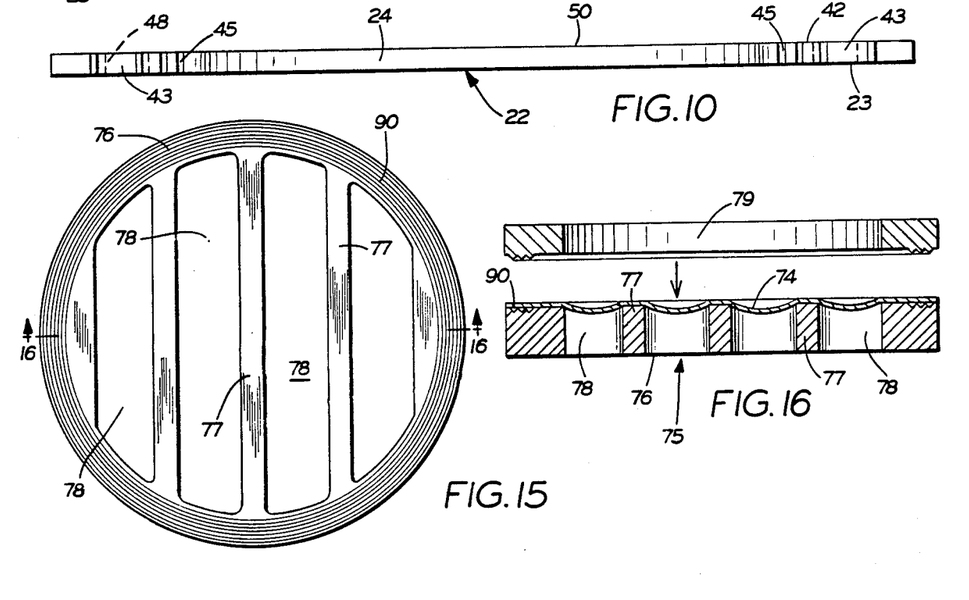
FIG. 10 is a top plan view of the rib of FIG. 9.
FIG. 15 is a plan view of the screen support member of a third screen assembly embodiment.
FIG. 16 is a sectional view taken on line 16—16, FIG. 15, in combination with a clamping ring and mesh screen.

In accordance with one of the main features of the invention, a plurality of ribs 22, one of which is shown particularly in FIGS. 8-10, are mounted in a spaced parallel relationship between side supports 5 and side clamping plate 16. Ribs 22 preferably are integral members, each having a pair of spaced end mounting pads 23 and an intervening concavely curved rib section 24. Ribs 22 enable screen 15 to withstand downstream shear forces imparted by the flowing rubber compound. When a plurality of ribs 22 are assembled in their spaced relationship, the individual ribs are separated by one or more spacers 26, each of which have a configuration generally complementary to that of rib mounting pads 23. Spacers 26 provide for the formation of a plurality of elongated parallel slots 27 between adjacent ribs, as shown particularly in FIG. 6 and 8 and enable the screen support system to be easily redesigned by changing these inexpensive members. Each rib end pad 23 is provided with a stepped shoulder 28 which is abutted against a similarly-shaped stepped shoulder 29 formed along opposed edges of discharge opening 9 of transition plate 2 as shown particularly in FIG. 3, for maintaining ribs 22 in a secured anchored position.

Figure 1:
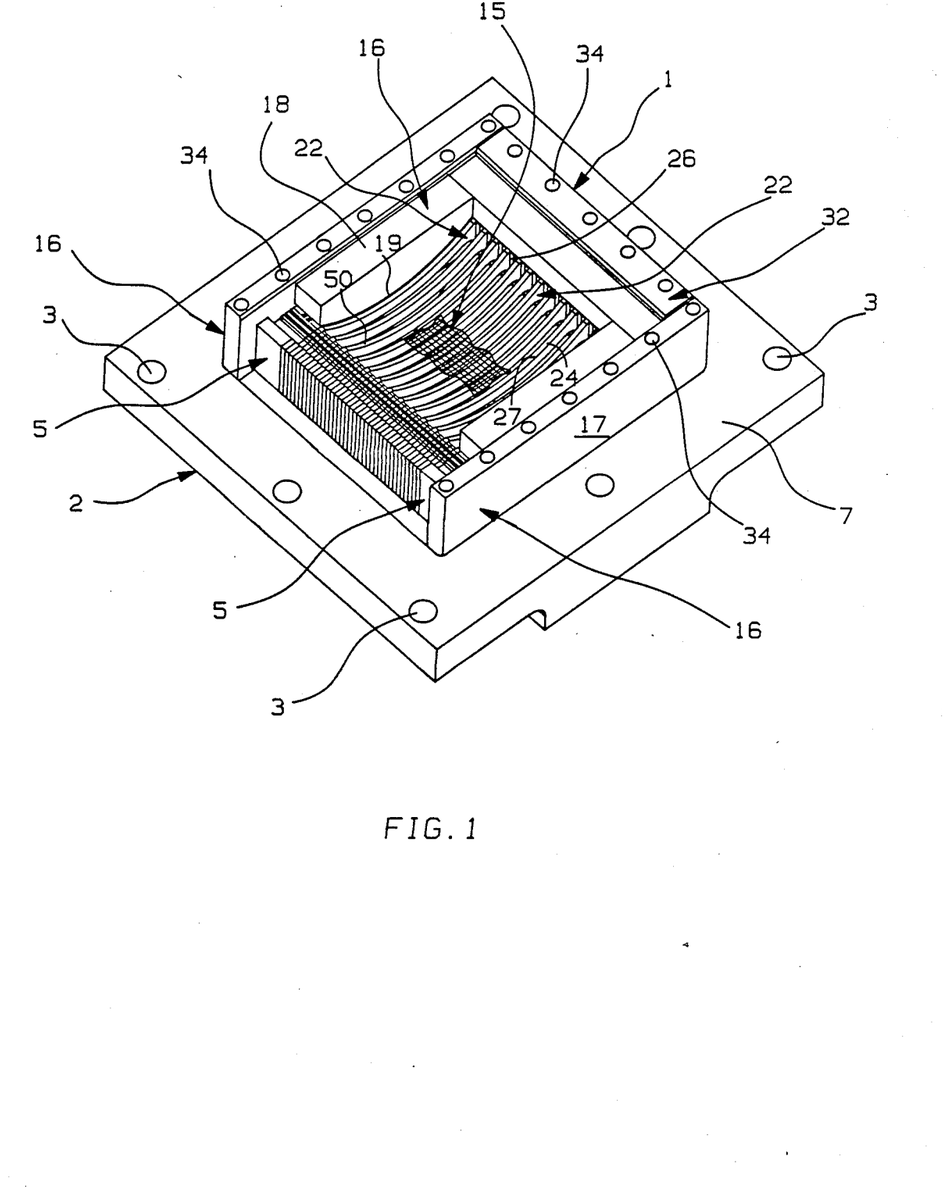
FIG. 1 is a perspective view of the improved screen assembly shown mounted on a die transition plate looking or viewed from the upstream side of the screen assembly with only a portion of the mesh screen being shown.
Figure 2:
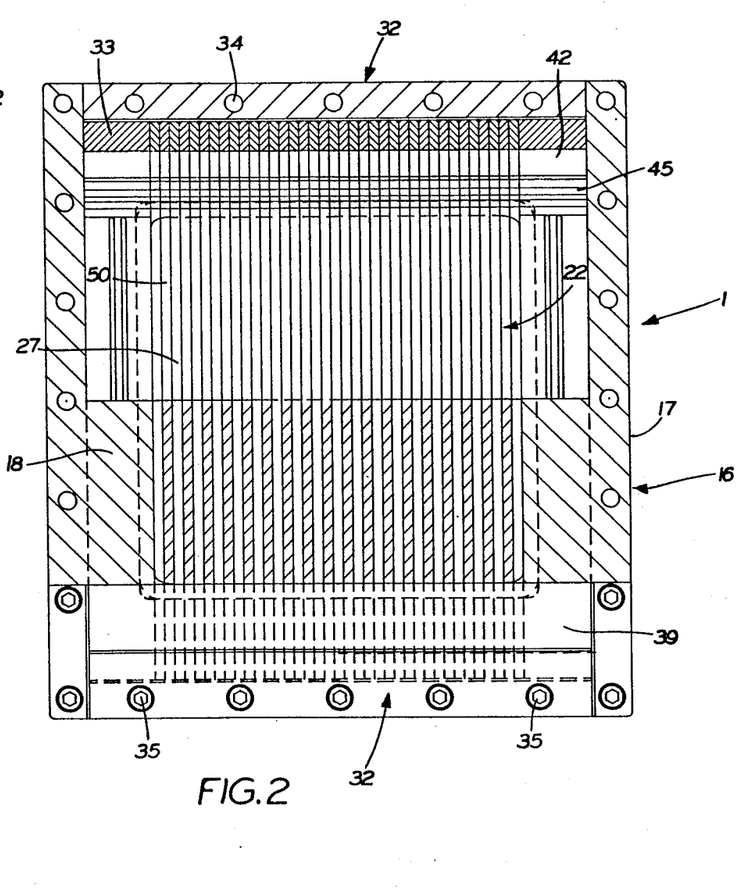
FIG. 2 is an enlarged partial plan view, with portions shown in section, of the screen assembly as shown in FIG. 1.
Figure 3:
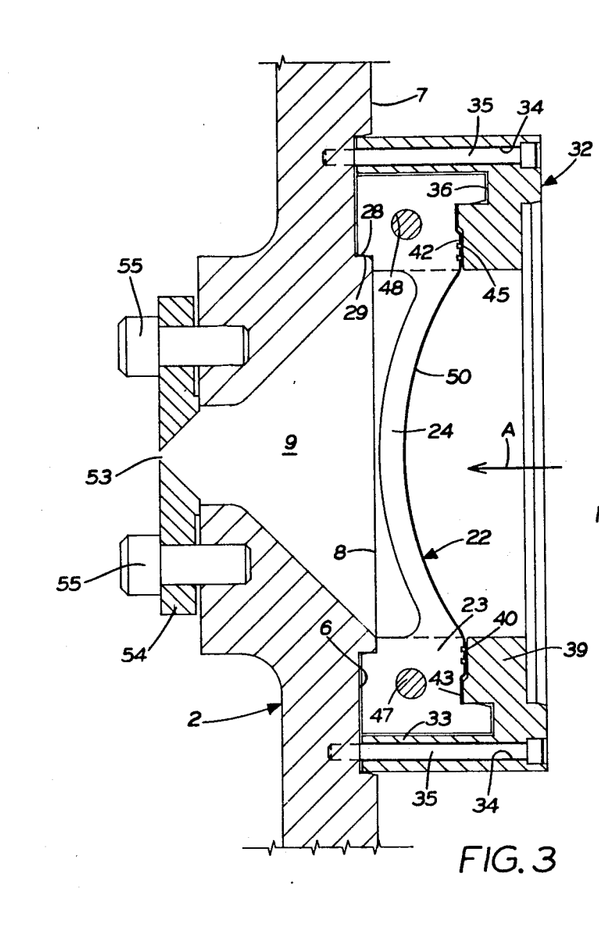
FIG. 3 is a fragmentary sectional view of the improved screen assembly shown mounted on the die transition plate.
Figure 4:
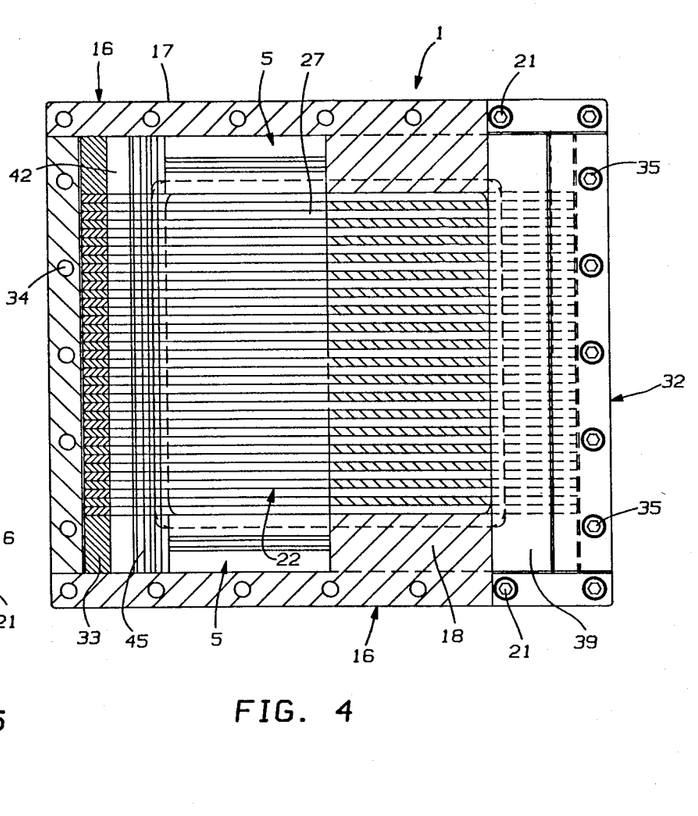
FIG. 4 is a fragmentary plan view, with portions in section, similar to FIG. 2 rotated 90°.

A plurality of spaced ribs 22 are securely clamped by a pair of end clamping plates 32 within recess 6 of transition plate 2 and extend across discharge opening 9. Plates 32 are similar to each other, therefore only one of them is described in detail, and only one of which is shown in FIGS. 1 and 6, with the pair thereof being shown in FIG. 3. Each plate 32 has a main wall 33 formed with a plurality of spaced bolt holes 34, through which bolts 35 extend as shown in FIG. 3, for mounting plates 32 on transition plate 2 and for clamping ribs 22 in position. Each plate 32 further includes an undercut groove 36 into which a complementary-shaped projection 37 of each rib end mounting pad 23 extends to assist in locking ribs 22 in position. End clamp plates 32 further includes an outwardly extending clamp pad 39 which includes a stepped shoulder 40 (FIG. 3) which clamps against a grooved top surface 42 of rib mounting pads 23 and extends into a recessed grove 43 formed therein. Top surface 42 of rib pad 23 is formed with a plurality of parallel elongated grooves 45 for receiving a ferrule or other member to assist in securing screen 15 in clamped position.

Ribs 22 are maintained in alignment within transition plate recess 6 by a pair of shoulder bolts 47 (FIG. 3) which extend through aligned holes 48 formed in each of the rib mounting pads 23 and through holes 49 formed in each of the side supports 5.

Figure 8A:
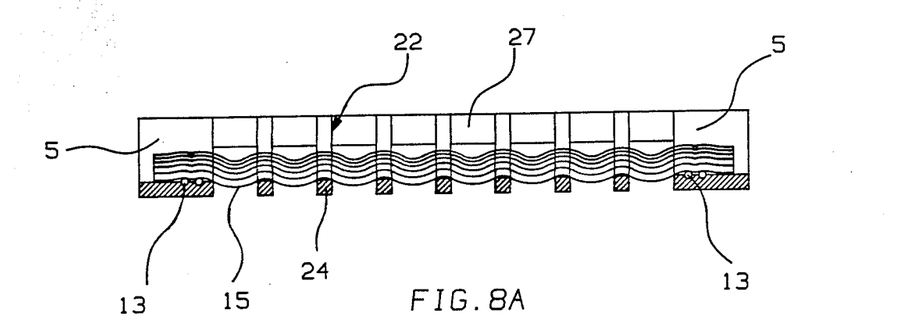
FIG. 8A is a cross-sectional diagrammatic view of the mesh screen draped across the support ribs with only the warp wire being shown for clarity.

In assembling screen assembly 1, side supports 5 are bolted to the ribs and spacers and then the assembly is placed within transition plate recess 6 as shown in FIG. 6. Afterwhich metal mesh screen 15 is placed in juxtaposition on rib concave top surfaces 50 and draped over the ribs with the opposed edges being clamped against concave surfaces 12 of side supports 5 by convex surfaces 19 of clamp portion 18 of each of the clamping plates 16. Preferably the screen is draped over the ribs as shown in FIG. 8A by some type of mechanical means or pressure forces so that maximum span between the rib supports can be used since it is the upstream vector (i.e. tangent) of wire angle that resists the downstream shear forces from the rubber compound. The opposite pair of screen edges are clamped against top surfaces 42 of the spaced ribs by the clamping surfaces of clamp pads 39 of end clamping plates 32. The curved concave surfaces of the ribs transmit forces from the screen as tension forces to the end support members which distribute these tension forces to the various anchoring locations. Optimum curvature may be a circular arc in the case of very high screen pressure drops and minimal shear stresses in the flow passages above and below the screen, to a catenary for the opposite situation.

The particular arrangement of side supports 5, and clamping plates 16 and 32, provides a rigid four-sided frame, which as discussed above, is clamped in position in recess 6 of transition plate 2. Furthermore, screen 15 is securely clamped in position along all four edges by plates 16 and 32, and lies in juxtaposition with generally smooth top surfaces 50 of concavely-shaped rib sections 24. Likewise, the use of ferrules in the various grooves of rib end pads 23 and the grooves 11 in concave top surfaces 12 of side support pedestals 5, provide a secure locking and clamping engagement with side plates 16 and end plates 32.

Mesh screen 15 is a high strength work hardened stainless steel wire cloth formed by a plurality of interwoven wire strands, the particular mesh of the screen and diameter of the wire strands being dependent upon the particular screen application with which the improved screen assembly is intended for use. The particular screen mesh may vary as well as the size of the individual wire thereof, in order to meet various production standards and screening results. Annealed screen does not develop the full potential of the present invention since it would require closer spacing and therefore greater pressure drop.

Thus, when screen assembly 1 is placed in operation, the extruded flow of rubber indicated by arrow A in FIG. 3, passes initially through screen 15 and then between the elongated slots 27 formed between ribs 22. The screen removes any foreign particles contained in the rubber compound, prior to the rubber compound, passing through extrusion plate channel 9 for subsequent discharge through a die orifice 53 formed in a die plate 54 which is mounted by a plurality of bolts 55 onto transition plate 2 (FIG. 3).

Although the above screen support is described as being formed of a number of components which are assembled and bolted together, the ribs and end supports and spacers can be formed as an integral one-piece member without affecting the concept of the invention.

A second embodiment of the improved screen assembly, is indicated generally at 60, and is shown particularly in FIGS. 11-14. Screen assembly 60 includes two main components, a metal mesh screen 61 and a screen support member, indicated generally at 62. Support member 62 preferably is an integral one-piece metal member having an annular outer mounting ring 63, which has sealing surfaces 64 and 65. A plurality of spaced parallel ribs 66 are formed integrally with ring 63 and extend across the ring opening 68 forming a plurality of elongated slots 69 therebetween. The massive annular support member 62 neutralizes tension forces from the rib ends as well as permanently fixing the spacing between the ribs.

Figure 11:
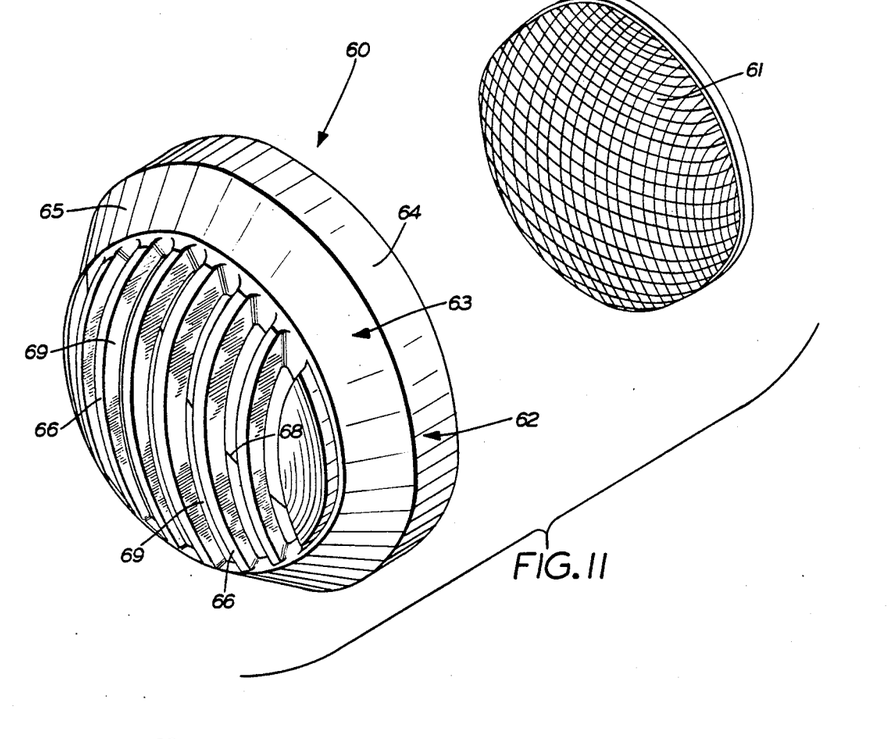
FIG. 11 is an exploded perspective view of a second embodiment of the improved screen assembly viewed from the downstream side.
Figure 12:
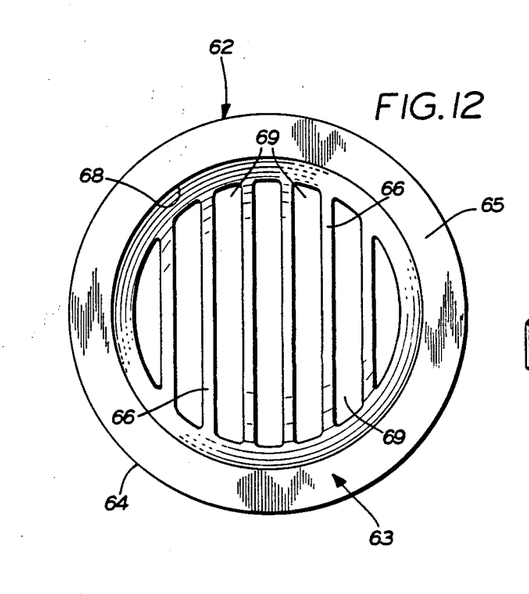
FIG. 12 is a plan view of the screen support member of the screen assembly embodiment shown in FIG. 11.
Figure 13:
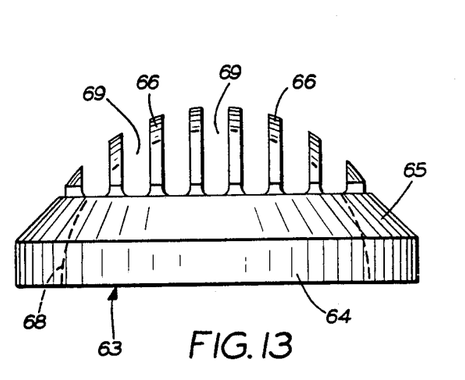
FIG. 13 is an elevational view of the screen support member shown in FIGS. 11 and 12.

In accordance with one of the features of screen assembly 60, ribs 66 are concave and assume a hemispherical configuration. It is well known that a structure having a spherical configuration is able to withstand greater internal pressures than other structural configurations.

Figure 14:
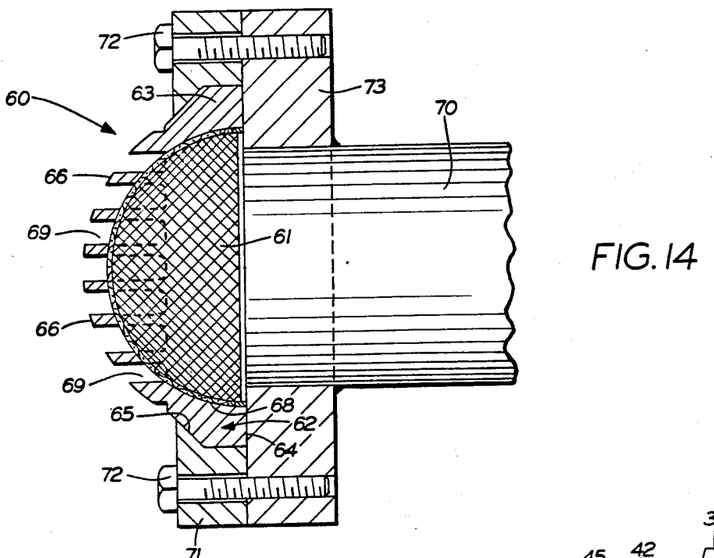
FIG. 14 is a generally diagrammatic sectional view of the screen assembly embodiment of FIG. 11, shown mounted on the outlet end of an extruder nozzle.

Screen assembly 60 is shown in FIG. 14 mounted on the discharge end of a extruder barrel 70 on an extruder by a mounting plate 71, which is secured by bolts 72 to an attachment flange 73. The particular mounting arrangement of screen assembly 60 as shown in FIG. 14, is merely illustrative of one type of mounting arrangement with which the improved screen assembly may be utilized for securely clamping screen 61 at the discharged end of an extruder barrel 70.

A third embodiment of the improved screen assembly is indicated generally at 75, and is shown particularly in FIG. 15 and 16. This third embodiment includes an integral one-piece member consisting of an annular ring 76 having a plurality of integral parallel spaced ribs 77 extending across the ring which form a plurality of elongated slots 78 therebetween. The ribs 77 lie in a common plane and have a flat configuration in contrast to the concavity of ribs 22 and 66 of screen assemblies 1 and 60, respectively, as described above. A usual preferably disc-shaped mesh metal screen 74 will be supported on and draped over screen support member 75 and clamped in juxtaposition against ribs 77 on the upstream side thereof by an annular clamp ring 79 for removing the foreign particles from the rubber compound being passed therethrough in a similar manner as described above with respect to embodiments 1 to 60. A plurality of annular grooves 90 preferably are formed in the surface of annular ring 76 which engages screen 74 to assist in preventing the screen circumference from being dragged down into the flow stream of the rubber compound.

The particular embodiment shown in FIGS. 15 and 16 in which straight ribs 77 are used, in contrast to the concavely-shaped ribs of embodiments 1 and 60, is used with small diameter extruders, preferably having an orifice diameter of 5 inches or less. Whereas embodiments 1 and 60 are preferably used with extruders having a diameter of between 5 and 15 inches. The straight ribs must of necessity be much shorter than the curved ribs of the first embodiment, but do provide a useful design for cramped spaces and generate much less pressure drop than conventional drilled breaker plates.

Figure 17:
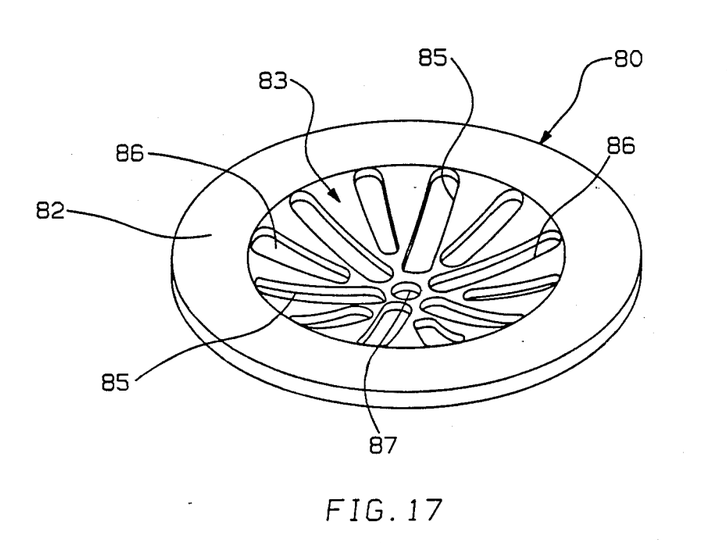
FIG. 17 is a perspective view of the screen support member of a forth screen assembly embodiment.
Figure 18:
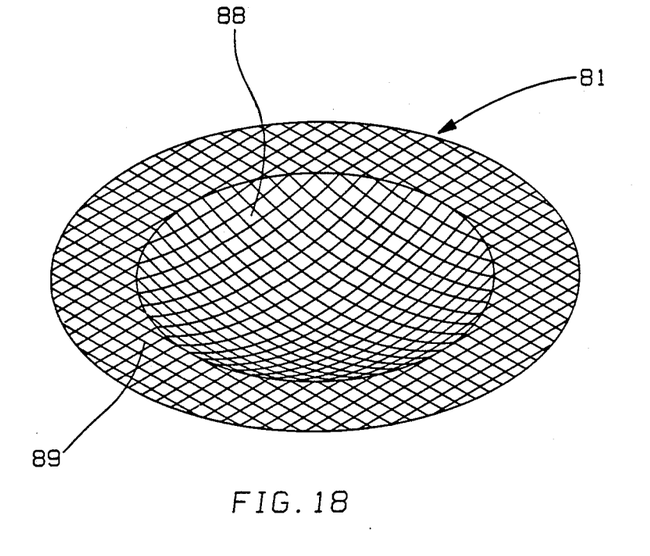
FIG. 18 is a perspective view of the mesh screen for use with the screen support member of FIG. 17.

A fourth embodiment of the invention is shown in FIGS. 17 and 18, and consists of a dish-shaped screen support member 80 and a dish-shaped mesh metal screen 81. Support plate 80 preferably is an integral one-piece metal member having an outer annular ring 82 and a dome-shaped central portion 83.

A first series of radially extending elongated slots 85 are formed in dome-shaped central portion 83, with a second series of shorter length elongated radially extending slots 86, being interposed between adjacent pairs of the larger slots 85. Preferably a circular central hole 87 is formed in central portion 83 to provide additional area for the passage of the screened rubber compound to pass therethrough.

Screen 81 preferably has a dome-shaped central portion 88 integral with an annular flange portion 89. Dome-shaped central portion 88 of screen 81 preferably is complementary in shape and curvature to that of dome-shaped central portion 83 of support plate 80 so as to lie in juxtaposition therewith with screen flange 89 lying in juxtaposition with outer annular ring 82 of support plate 80 where it is clamped thereagainst by a usual annular clamping and holding device.

All of the embodiments discussed above provide a screen assembly which provides a plurality of elongated slots formed by a plurality of spaced rigid metal ribs, preferably concavely-shaped for most applications, wherein the concavity is in the direction of travel of the stream of extruded elastomeric material. The ribs provide a rigid support for a mesh metal screen preferably draped or preformed to match the concavity of the supporting rib, in which the screen may be formed of various mesh sizes and wire thickness, depending upon the particular elastomeric material being screened therethrough. The use of elongated slots in contrast to the heretofore used perforated plates having circular-shaped holes formed thereon, reduces considerably the amount of back pressure generated in the elastomeric material as it is being discharged from the extruder, and is able to provide a rigid structure, better able to withstand the high internal pressures created by the extruded elastomeric material, and most importantly, without reducing materially the flow output of the extruder. The slots formed between the spaced ribs preferably are wider in the transverse direction than the transverse thickness of the ribs to provide sufficient flow space for the elastomeric material as it passes through the screen to reduce the back pressure.

Another advantage of the improved screen assembly and in particular the construction shown in the first embodiment, is the ability to replace individual ribs of the screen support member, should they become damaged without requiring replacement of the entire unit. For example, special ribs fitted with strain gages for stress measurement have been included in the assembly for cold-start tests. Furthermore, the transverse spacing between the ribs, can be varied easily by increasing or decreasing the size and number of spacer plates between the adjacent pairs of ribs to provide various operating characteristics to match the characteristics of the particular elastomeric material being extruded therefrom and the particular mesh screen 15.

Still another advantage is that the mesh metal screen which is draped over or preformed to the supporting ribs, is rigidly clamped by the screen support member in several of the embodiments discussed above, to prevent damage to the screen and to insure that it remains in proper position with respect to the support ribs. Screen 61 of embodiment 60 need not be clamped but seats properly within the concavity of the hemispherically-shaped interior of screen support member 62.

Another advantage of the improved screen assemblies is that the screen supporting ribs assume a suspension type construction in contrast to prior art screen reinforcement members that assumed a beam characteristic thereby enabling the ribs to withstand greater forces with less metal thickness than prior flat perforated breaker plates. Also for certain applications the ribs could be formed of a flexible material such as wire cable or the like, in contrast to the above described rigid ribs. In such a construction the ribs could be mounted in suspension and extend across the extruder discharge opening and support a screen thereon and can assume a hemispherical configuration if desired which is the most effective angle for force distribution, thereby increasing even further the efficiency of the screen support member.

Most importantly, the major advantage obtained by the improved screen assembly is the ability to reduce back pressure in the incoming stream of elastomeric material without decreasing the flow rate of the material being extruded therefrom. This is achieved by the screen assembly consisting principally of a screen support member and the mesh metal screen supported thereby, and in an assembly which is easily adapted for use on most known extruders for elastomeric materials.

Accordingly, the improved screen assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved screen assembly is constructed and used, the characteristics of the construction, and the advantageous, new and useful results obtained; the new and useful structures, devices, elements, arrangements, parts, and combinations, are set forth in the appended claims.

We claim:
1. A screen assembly including:
   (a) a mesh screen adapted to be mounted adjacent a discharge outlet of an extruder for removing foreign particles from a material being discharged from the extruder;
   (b) support means for supporting the mesh screen adjacent the discharge outlet of the extruder, said support means having a plurality of spaced elongated support ribs concavely-shaped in the flow direction of the material being discharged from the extruder forming a plurality of elongated slots therebetween for passage of the discharged material therethrough, with said screen being in juxtaposition to the ribs on the upstream side of the discharged material and being concavely-shaped complementary in curvature to the concavity of the support ribs; and
   (c) means for mounting the support means and screen adjacent the discharge end of the extruder.
2. The assembly defined in claim 1 in which said screen is formed of a high strength, work-hardened stainless steel wire cloth.
3. The assembly defined in claim 1 in which the support means includes an outer annular ring with the ribs being formed integral therewith; and in which the concavely-shaped ribs form a slotted dome-shaped concave central portion.
4. The assembly defined in claim 3 in which the mesh screen is preformed concavely-shaped and is seated within the dome-shaped central portion of the support means.
5. The assembly defined in claim 3 in which the dome-shaped concave central portion is hemispherically-shaped.
6. The assembly defined in claim 1 in which the transverse thickness of the ribs is less than the transverse width of the elongated slots formed therebetween.
7. The assembly defined in claim 1 in which the support means includes a pair of spaced end clamping members; in which each of the ribs have spaced end mounting pads; and in which the ribs are individually removably mounted in a parallel spaced relationship by engagement of the end clamping members with the end mounting pads.
8. The assembly defined in claim 7 in which spacer plates are mounted between spaced pairs of the ribs to maintain said ribs in the parallel spaced relationship.
9. The assembly defined in claim 8 in which a hole is formed in each of the end mounting pads of the ribs and in the spacer plates; in which the holes are in transverse alignment with each other; and in which bolt means extends through said aligned holes for retaining said ribs and spacer plates with respect to a pair of spaced side support members.
10. The assembly defined in claim 8 in which each of the end clamping members is formed with a transversely extending undercut groove; and in which the rib mounting pads and spacer plates each have an anchoring projection formed thereon which seat in the undercut groove of the end clamp members to assist in anchoring said ribs and spacer plates with said end clamping members.

11. The assembly defined in claim 8 in which the mounting means includes an extrusion head having a converging extrusion outlet flow channel formed therein; and in which an extrusion die is mounted on the extrusion head in alignment with the outlet flow channel.

12. The assembly defined in claim 11 in which the extrusion head is formed with a pair of spaced transversely extending mounting channels; and in which the end clamping members are seated in said mounting channels.

13. The assembly defined in claim 7 in which the support means further includes a pair of spaced side clamping members extending transversely to the spaced end clamping members and forming a generally rectangular frame providing a rectangular opening therebetween; in which the ribs extend across said rectangular opening; in which the mounting means includes a plate having pairs of spaced mounting channels formed therein; and in which the end and side clamping members are seated in respective spaced pairs of mounting channels to assist in anchoring said clamping members on the mounting plate.

14. The assembly defined in claim 13 in which the support means further includes a pair of side support members assembled with the ribs and in clamping engagement with the side clamping members; in which screen retention grooves are formed in each of the side support members; and in which a ferrule is mounted in said retention grooves to assist in retaining an outer periphery of the mesh screen in clamped engagement between said side clamping members and side support members.

15. A screen assembly for removing foreign particles from a material being discharged from an outlet of an extruder including; a disc-shaped screen support member adapted to be mounted adjacent the discharge end of the extruder, said support member having an outer annular ring-like member and a central portion, said central portion containing a plurality of ribs formed integral with the outer annular ring and forming a plurality of elongated parallel slots, said ribs being in a parallel spaced relationship and are concavely curved in the direction of the material being discharged from the extruder and form a dome-shaped central portion and with the transverse thickness of each of the ribs being less than the transverse width of the intervening slots; and a mesh screen concavely-shaped complementary to the dome-shaped central portion of the support member and seated within said central portion.

16. The assembly defined in claim 15 in which the dome-shaped central portion is hemispherically-shaped.

17. In combination, an extruder and a screen assembly, said screen assembly including a mesh screen adapted to be mounted adjacent a discharge outlet of the extruder for removing foreign particles from an elastomeric material being discharged from the extruder, support means for supporting the mesh screen adjacent the discharge outlet of the extruder, said support means having a plurality of spaced elongated support ribs concavely-shaped in the flow direction of the material being discharged from the extruder forming a plurality of elongated slots therebetween for passage of the discharged material therethrough, with said screen being in juxtaposition to the ribs on the upstream side of the discharged material and being concavely-shaped complementary in curvature to the concavity of the support ribs, and means for mounting the support means and screen adjacent the discharge end of the extruder.

* * * * *